(12) United States Patent
Kani

(10) Patent No.: US 11,483,023 B2
(45) Date of Patent: Oct. 25, 2022

(54) RADIO-FREQUENCY MODULE AND COMMUNICATION DEVICE

(71) Applicant: Murata Manufacturing Co., Ltd., Nagaokakyo (JP)

(72) Inventor: Hiroyuki Kani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/327,771

(22) Filed: May 24, 2021

(65) Prior Publication Data
US 2021/0391887 A1    Dec. 16, 2021

(30) Foreign Application Priority Data
Jun. 10, 2020   (JP) .............................. JP2020-100860

(51) Int. Cl.
*H04B 1/40*    (2015.01)
*H04B 1/04*    (2006.01)
*H04B 1/10*    (2006.01)

(52) U.S. Cl.
CPC ............. *H04B 1/40* (2013.01); *H04B 1/0458* (2013.01); *H04B 1/0475* (2013.01); *H04B 1/1018* (2013.01)

(58) Field of Classification Search
CPC .. H04B 1/0458; H04B 1/0475; H04B 1/1018; H04B 1/40
See application file for complete search history.

(56) References Cited

U.S. PATENT DOCUMENTS

| | | | | |
|---|---|---|---|---|
| 2008/0283279 | A1* | 11/2008 | Ogawa | H01L 23/49811 257/E23.068 |
| 2014/0262442 | A1* | 9/2014 | Nomura | H05K 1/113 427/97.8 |
| 2017/0093366 | A1* | 3/2017 | Kikuchi | H03H 9/02984 |
| 2020/0077510 | A1* | 3/2020 | Darveaux | H05K 1/183 |

FOREIGN PATENT DOCUMENTS

JP    2012-33885 A    2/2012

* cited by examiner

*Primary Examiner* — Nguyen T Vo
(74) *Attorney, Agent, or Firm* — Xsensus LLP

(57) ABSTRACT

A radio-frequency module includes a module substrate. The module substrate includes a first principal surface; a second principal surface on a side of the module substrate that is opposite to the first principal surface; a third principal surface that is recessed toward the first principal surface from the second principal surface in a plan view of the second principal surface; a recessed region in which the third principal surface is a bottom surface; and a protruding region located on an outer periphery of the recessed region, in a plan view of the second principal surface, wherein the protruding region has a via conductor disposed therein, the via conductor extending in a direction perpendicular to the second principal surface and having an end exposed on the second principal surface.

18 Claims, 4 Drawing Sheets

RADIO-FREQUENCY MODULE AND COMMUNICATION DEVICE

CROSS-REFERENCE TO RELATED APPLICATION

The present application claims priority to Japanese patent application JP2020-100860, filed Jun. 10, 2020, the entire contents of which being incorporated herein by reference.

BACKGROUND

1. Field of the Disclosure

The present disclosure relates to a radio-frequency (RF) module and a communication device.

2. Description of the Related Art

Japanese Unexamined Patent Application Publication No. 2012-33885 discloses an RF module (electronic component module) in which electronic components constituting an RF front-end circuit are mounted on both surfaces of a circuit board. The electronic components mounted on the circuit board are covered with sealing resin layers. The sealing resin layers each have therein a conductive post for electrically connecting the circuit board to an external substrate.

SUMMARY

In the RF module disclosed in Japanese Unexamined Patent Application Publication No. 2012-33885, the conductive posts are formed in a process different from a process of forming the circuit board, and thus the number of processes of manufacturing the RF module increases. In addition, regions for the conductive posts are to be secured outside the circuit board, which makes it is difficult to reduce the size of the RF module.

Accordingly, one object of the present disclosure to provide a radio-frequency module and a communication device that have a simplified manufacturing process and that have a reduced size.

According to embodiments of the present disclosure, a radio-frequency module includes a module substrate having a first principal surface and a second principal surface that face each other, a first circuit component, and a second circuit component. The module substrate further has a third principal surface that is recessed toward the first principal surface from the second principal surface in a plan view of the second principal surface. The module substrate includes a recessed region in which the third principal surface is a bottom surface, and a protruding region located on an outer periphery of the recessed region, in a plan view of the second principal surface. The protruding region has a via conductor disposed therein, the via conductor extending in a direction perpendicular to the second principal surface and having one end exposed on the second principal surface. The first circuit component is disposed on the first principal surface. The second circuit component is disposed on the third principal surface in the recessed region.

According to the embodiments of the present disclosure, it is possible to provide a radio-frequency module and a communication device that have a simplified manufacturing process and that have a reduced size.

Other features, elements, characteristics and advantages of the present disclosure will become more apparent from the following detailed description of embodiments of the present disclosure with reference to the attached drawings.

DETAILED DESCRIPTION

Figure 1:
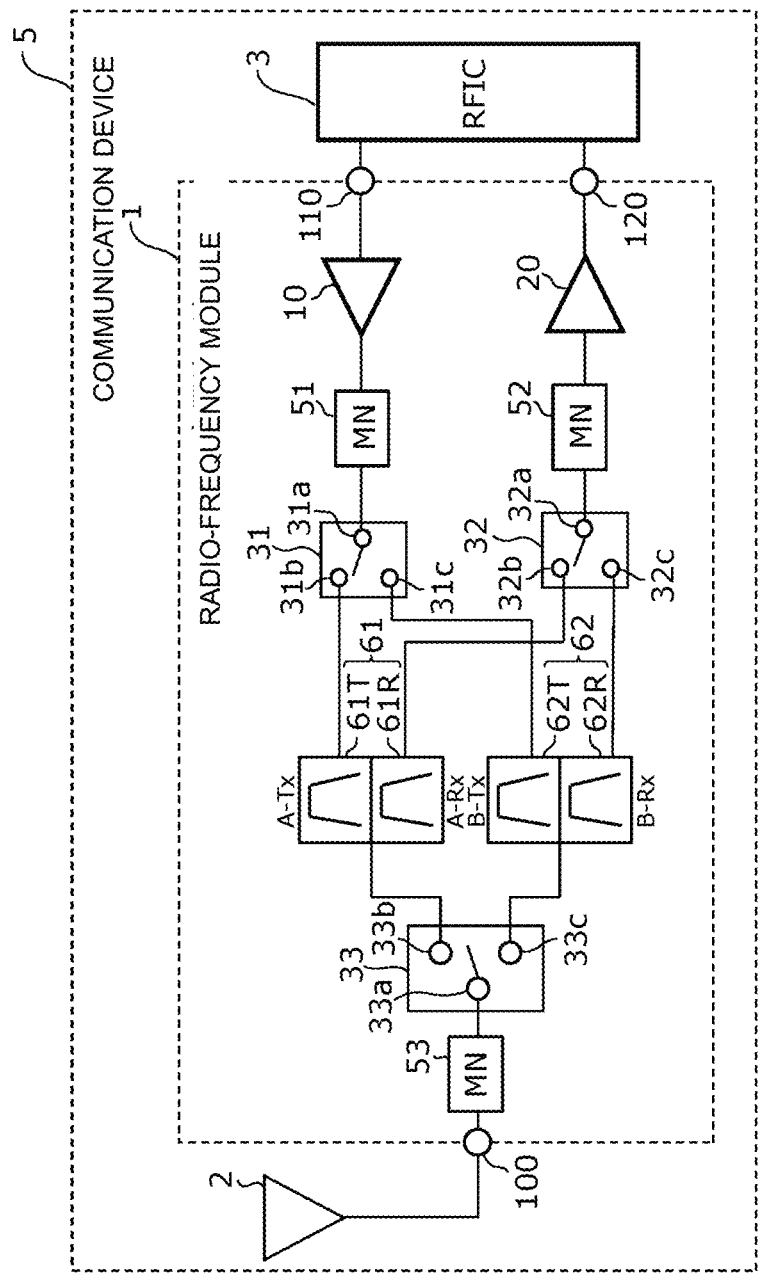
FIG. 1 is a circuit configuration diagram of a radio-frequency module and a communication device according to an embodiment.

Hereinafter, an embodiment of the present disclosure will be described in detail. The embodiment described below illustrates a general or specific example. The numerical values, shapes, materials, elements, the disposition and connection manner of the elements, and so forth described in the following embodiment are merely examples and are not intended to limit the present disclosure. Elements not described in the independent claims among the elements in the following example and modification example will be described as optional elements. The sizes of the elements illustrated in the drawings or the ratios between the sizes are not necessarily exact. In the drawings, elements that are substantially the same are denoted by the same reference numerals, and duplicate description may be omitted or simplified.

In the following description, terminology representing the relationship between elements, such as parallel and vertical, terminology representing the shape of an element, such as rectangular, and the range of a numerical value mean not only an exact relationship, an exact shape, and an exact range, respectively, but also a substantially equivalent relationship, a substantially equivalent shape, and a substantially equivalent range, respectively, and a difference of about several %, for example, is included.

In the following description, regarding A, B, and C mounted on a substrate, "C is disposed between A and B in a plan view of the substrate (or a principal surface of the substrate)" means that at least one of a plurality of line segments connecting certain points in A and certain points in B passes through the region of C in a plan view of the substrate. "In a plan view of the substrate" means that the substrate and circuit elements mounted on the substrate are viewed in orthogonal projection on a plane parallel to the principal surface of the substrate.

In the following description, a "transmission path" means a transmission line constituted by a wiring line through which a radio-frequency transmission signal propagates, an electrode directly connected to the wiring line, a terminal directly connected to the wiring line or the electrode, and so forth. A "reception path" means a transmission line constituted by a wiring line through which a radio-frequency reception signal propagates, an electrode directly connected to the wiring line, a terminal directly connected to the wiring line or the electrode, and so forth. A "transmission/reception path" means a transmission line constituted by a wiring line through which a radio-frequency transmission signal and a radio-frequency reception signal propagate, an electrode directly connected to the wiring line, a terminal directly connected to the wiring line or the electrode, and so forth.

Embodiment

1. Circuit Configuration of Radio-Frequency Module 1 and Communication Device 5

FIG. 1 is a circuit configuration diagram of a radio-frequency (RF) module 1 and a communication device 5 according to an embodiment. As illustrated in FIG. 1, the communication device 5 includes the RF module 1, an antenna 2, and an RF signal processing circuit (RF integrated circuit (RFIC)) 3.

The RFIC 3 is an RF signal processing circuit that processes an RF signal that is to be transmitted by the antenna 2 or that has been received by the antenna 2. Specifically, the RFIC 3 performs signal processing, such as down-conversion, on a reception signal received through a reception path of the RF module 1, and outputs the reception signal subjected to the signal processing to a baseband signal processing circuit (not illustrated). In addition, the RFIC 3 performs signal processing, such as up-conversion, on a transmission signal received from the baseband signal processing circuit, and outputs the transmission signal subjected to the signal processing to a transmission path of the RF module 1.

The RFIC 3 also functions as a control unit that controls, on the basis of a communication band (frequency band) that is used, connections of switches 31, 32, and 33 included in the RF module 1. Specifically, the RFIC 3 switches connections of the switches 31 to 33 included in the RF module 1 by using control signals (not illustrated). The RFIC 3 also functions as a control unit that controls the gain of a power amplifier 10 included in the RF module 1, and a power supply voltage Vcc and a bias voltage Vbias that are to be supplied to the power amplifier 10. Alternatively, the control unit may be disposed outside the RFIC 3.

The antenna 2 is connected to an antenna connection terminal 100 of the RF module 1, radiates an RF signal output from the RF module 1, and receives an RF signal from the outside and outputs the RF signal to the RF module 1.

In the communication device 5 according to the present embodiment, the antenna 2 is not an essential element.

Next, a detailed configuration of the RF module 1 will be described.

As illustrated in FIG. 1, the RF module 1 includes the antenna connection terminal 100, the power amplifier 10, a low-noise amplifier 20, transmission filters 61T and 62T, reception filters 61R and 62R, matching circuits 51, 52, and 53, and the switches 31, 32, and 33.

The antenna connection terminal 100 is connected to the antenna 2.

The power amplifier 10 is an amplifier circuit capable of amplifying transmission signals of a communication band A and a communication band B received from a transmission input terminal 110. Alternatively, the RF module 1 may include, instead of the power amplifier 10, a first power amplifier that amplifies an RF signal of the communication band A and a second power amplifier that amplifies an RF signal of the communication band B.

The low-noise amplifier 20 is an amplifier that is capable of amplifying RF signals of the communication bands A and B with low noise and that outputs the RF signals to a reception output terminal 120. The RF module 1 may include a plurality of low-noise amplifiers. For example, the RF module 1 may include a first low-noise amplifier that amplifies an RF signal of the communication band A and a second low-noise amplifier that amplifies an RF signal of the communication band B.

The power amplifier 10 and the low-noise amplifier 20 each include a field-effect transistor (FET), a heterojunction bipolar transistor (HBT), or the like composed of, for example, Si-based complementary metal oxide semiconductor (CMOS) or GaAs.

The transmission filter 61T is disposed on a transmission path that connects the transmission input terminal 110 and the antenna connection terminal 100, and allows a transmission signal of the transmission band of the communication band A among transmission signals amplified by the power amplifier 10 to pass therethrough. The transmission filter 62T is disposed on a transmission path that connects the transmission input terminal 110 and the antenna connection terminal 100, and allows a transmission signal of the transmission band of the communication band B among transmission signals amplified by the power amplifier 10 to pass therethrough.

The reception filter 61R is disposed on a reception path that connects the reception output terminal 120 and the antenna connection terminal 100, and allows a reception signal of the reception band of the communication band A among reception signals input from the antenna connection terminal 100 to pass therethrough. The reception filter 62R is disposed on a reception path that connects the reception output terminal 120 and the antenna connection terminal 100, and allows a reception signal of the reception band of the communication band B among reception signals input from the antenna connection terminal 100 to pass therethrough.

The transmission filter 61T and the reception filter 61R constitute a duplexer 61 whose pass band is the communication band A. The duplexer 61 transmits a transmission signal and a reception signal of the communication band A by using a frequency division duplex (FDD) scheme. The transmission filter 62T and the reception filter 62R constitute a duplexer 62 whose pass band is the communication band B. The duplexer 62 transmits a transmission signal and a reception signal of the communication band B by using the FDD scheme.

Alternatively, each of the duplexers 61 and 62 may be a multiplexer constituted by only a plurality of transmission filters, a multiplexer constituted by only a plurality of reception filters, or a multiplexer constituted by a plurality of duplexers. Alternatively, the transmission filter 61T and the reception filter 61R need not necessarily constitute the duplexer 61, and may be a single filter that performs transmission by using a time division duplex (TDD) scheme. In this case, a switch that switches between transmission and reception is disposed in at least one of the preceding stage or the subsequent stage of the single filter. Likewise, the transmission filter 62T and the reception filter 62R need not necessarily constitute the duplexer 62, and may be a single filter that performs transmission by using the TDD scheme.

Each of the transmission filters 61T and 62T and the reception filters 61R and 62R may be, for example, any one of an acoustic wave filter using a surface acoustic wave (SAW), an acoustic wave filter using a bulk acoustic wave (BAW), an LC resonance filter, and a dielectric filter, and is furthermore not limited thereto.

The matching circuit 53 is an example of a third matching circuit, is disposed on a path that connects the antenna connection terminal 100 and the switch 33, and achieves impedance matching between the switch 33 and the antenna 2 and between the duplexers 61 and 62 and the antenna 2. The matching circuit 51 is an example of a first matching circuit, is disposed on a transmission path that connects the power amplifier 10 and the switch 31, and achieves impedance matching between the power amplifier 10 and the switch 31 and between the power amplifier 10 and the duplexers 61 and 62. The matching circuit 52 is an example of a second matching circuit, is disposed on a reception path that connects the low-noise amplifier 20 and the switch 32, and achieves impedance matching between the low-noise amplifier 20 and the switch 32 and between the low-noise amplifier 20 and the duplexers 61 and 62.

The switch 33 is an example of a first switch that is connected to the antenna connection terminal 100 via the matching circuit 53 and that switches between connection and non-connection between the antenna connection terminal 100 and the low-noise amplifier 20, and includes a common terminal 33a and selection terminals 33b and 33c. The common terminal 33a is connected to the matching circuit 53, the selection terminal 33b is connected to the duplexer 61, and the selection terminal 33c is connected to the duplexer 62. With this connection configuration, the switch 33 switches between connection and non-connection between the antenna connection terminal 100 and the duplexer 61, and switches between connection and non-connection between the antenna connection terminal 100 and the duplexer 62. The switch 33 is constituted by, for example, a single pole double throw (SPDT) switch circuit.

The switch 31 is a second switch connected to an output terminal of the power amplifier 10 via the matching circuit 51 and includes a common terminal 31a and selection terminals 31b and 31c. The common terminal 31a is connected to the output terminal of the power amplifier 10 via the matching circuit 51. The selection terminal 31b is connected to the transmission filter 61T, and the selection terminal 31c is connected to the transmission filter 62T. With this connection configuration, the switch 31 switches between connection and non-connection between the power amplifier 10 and the transmission filter 61T, and switches between connection and non-connection between the power amplifier 10 and the transmission filter 62T. The switch 31 is constituted by, for example, an SPDT switch circuit.

The switch 32 is a third switch connected to an input terminal of the low-noise amplifier 20 via the matching circuit 52 and includes a common terminal 32a and selection terminals 32b and 32c. The common terminal 32a is connected to the input terminal of the low-noise amplifier 20 via the matching circuit 52. The selection terminal 32b is connected to the reception filter 61R, and the selection terminal 32c is connected to the reception filter 62R. With this connection configuration, the switch 32 switches between connection and non-connection between the low-noise amplifier 20 and the reception filter 61R, and switches between connection and non-connection between the low-noise amplifier 20 and the reception filter 62R. The switch 32 is constituted by, for example, an SPDT switch circuit.

The numbers of common terminals and selection terminals included in the switches 31 to 33 are appropriately set in accordance with the number of signal paths included in the RF module 1.

In the configuration of the RF module 1, the power amplifier 10, the matching circuit 51, the switch 31, the transmission filter 61T, the switch 33, and the matching circuit 53 constitute a first transmission circuit that transmits a transmission signal of the communication band A toward the antenna connection terminal 100. The matching circuit 53, the switch 33, the reception filter 61R, the switch 32, the matching circuit 52, and the low-noise amplifier 20 constitute a first reception circuit that transmits a reception signal of the communication band A from the antenna 2 via the antenna connection terminal 100.

The power amplifier 10, the matching circuit 51, the switch 31, the transmission filter 62T, the switch 33, and the matching circuit 53 constitute a second transmission circuit that transmits a transmission signal of the communication band B toward the antenna connection terminal 100. The matching circuit 53, the switch 33, the reception filter 62R, the switch 32, the matching circuit 52, and the low-noise amplifier 20 constitute a second reception circuit that transmits a reception signal of the communication band B from the antenna 2 via the antenna connection terminal 100.

With the above-described circuit configuration, the RF module 1 is capable of performing at least any one of transmission, reception, and transmission-and-reception of an RF signal of either the communication band A or the communication band B. Furthermore, the RF module 1 is capable of performing at least any one of simultaneous transmission, simultaneous reception, and simultaneous transmission-and-reception of RF signals of the communication band A and the communication band B.

In an RF module according to an embodiment of the present disclosure, the above-described two transmission circuits and the above-described two reception circuits need not necessarily be connected to the antenna connection terminal 100 via the switch 33, and may be connected to the antenna 2 via different terminals.

The low-noise amplifier 20 and at least one of the switches 31 to 33 may be included in a single semiconductor integrated circuit (IC). The semiconductor IC is composed of, for example, CMOS. Specifically, the semiconductor IC is formed by a silicon on insulator (SOI) process. Accordingly, the semiconductor IC can be manufactured at low cost. Alternatively, the semiconductor IC may be composed of at least any one of GaAs, SiGe, and GaN. This makes it possible to output an RF signal having high-quality amplification performance and noise performance.

To reduce the size of the RF module 1, the circuit components constituting the RF module 1 may be disposed on both surfaces of a module substrate. In this case, a connection terminal for electrically connecting the RF module 1 to an external substrate is disposed on one side of the module substrate. However, if the connection terminal is formed in a process different from a process of forming the module substrate, the number of processes of manufacturing the RF module 1 increases. In addition, a region for the connection terminal is to be secured in the RF module 1, which makes it is difficult to reduce the size of the RF module 1.

Hereinafter, a description will be given of the configuration of the RF module 1 having a reduced size, in which a process of forming a connection terminal for electrically connecting the RF module 1 to an external substrate is simplified.

2. Layout of Circuit Elements of RF Module 1A According to Example

Figure 2A:
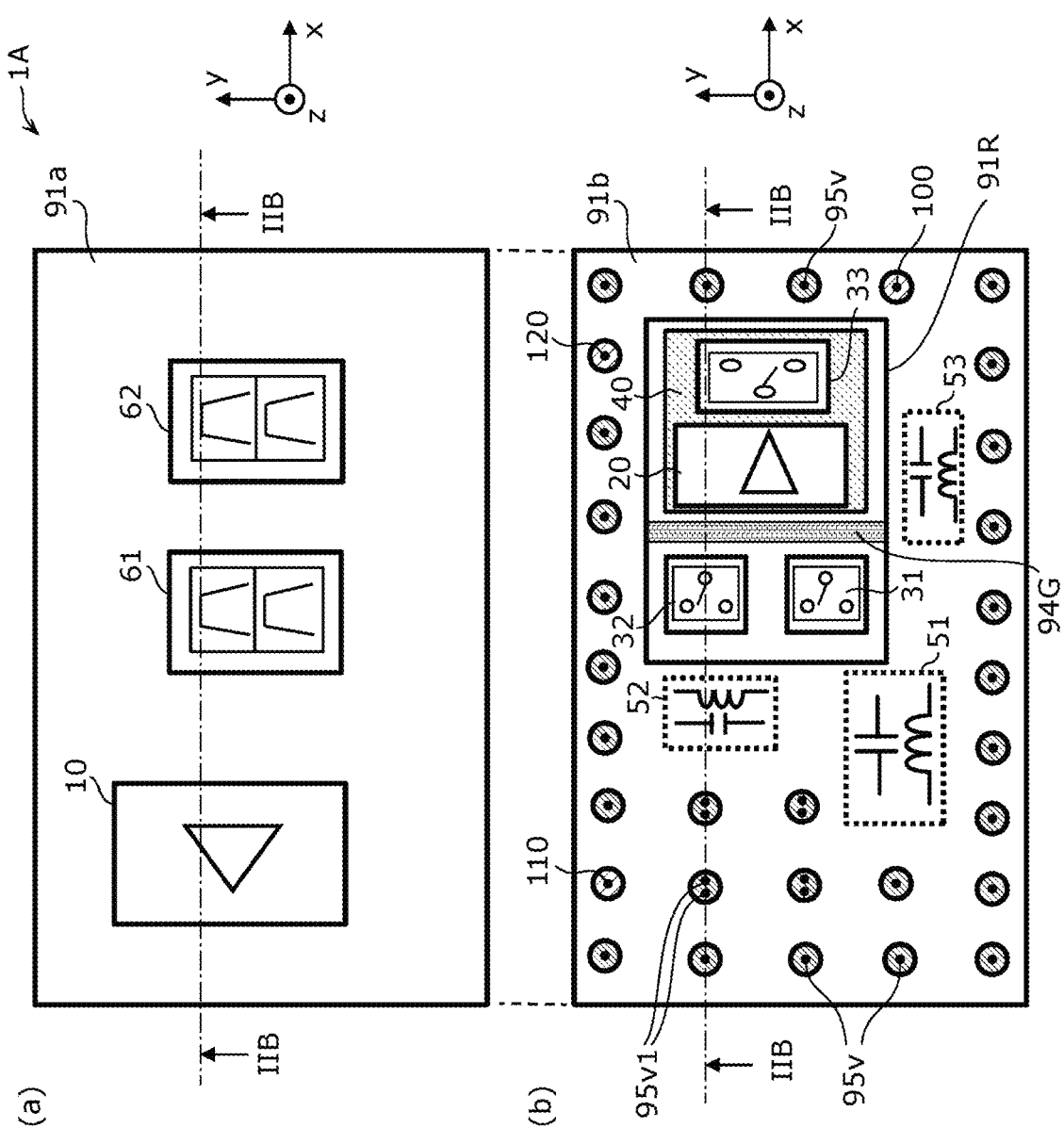
FIG. 2A is a schematic plan view of the configuration of a radio-frequency module according to an example.
Figure 2B:
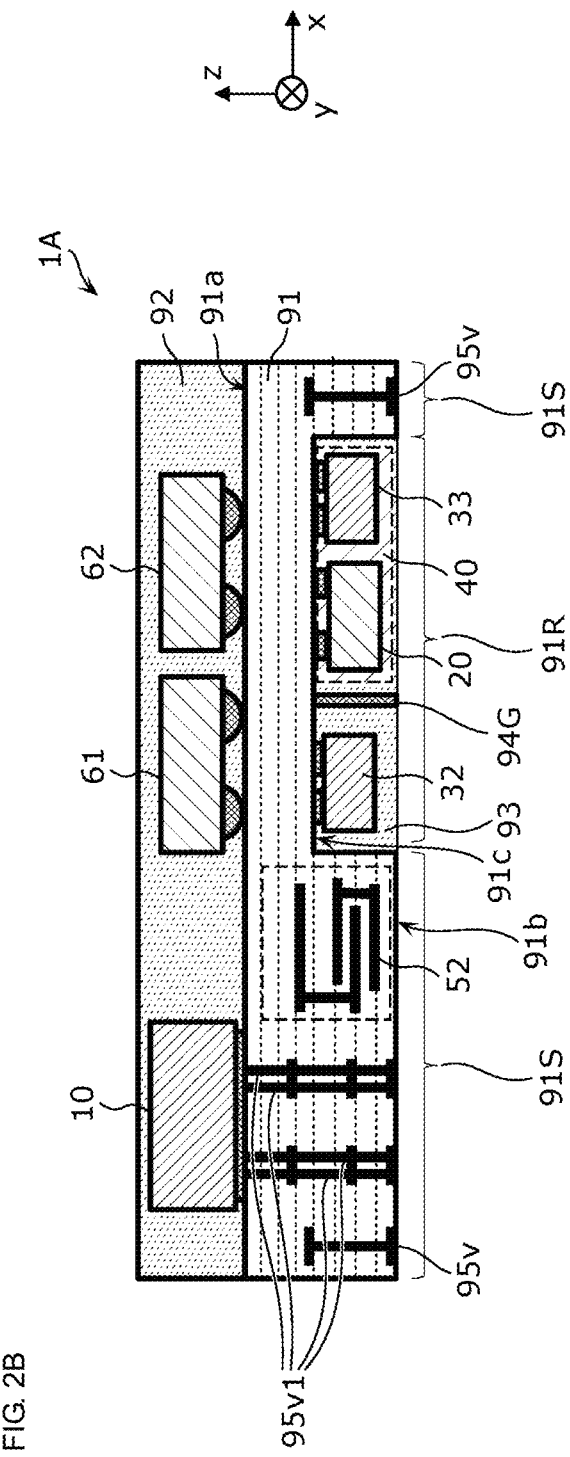
FIG. 2B is a schematic sectional view of the configuration of the radio-frequency module according to the example.

FIG. 2A is a schematic plan view of the configuration of an RF module 1A according to an example. FIG. 2B is a schematic sectional view of the configuration of the RF module 1A according to the example, and specifically is a sectional view taken along line IIB-IIB in FIG. 2A. Part (a) of FIG. 2A illustrates the layout of circuit elements when a principal surface 91a of principal surfaces 91a and 91b that are on opposite sides of the module substrate 91 is viewed from a z-axis positive direction. On the other hand, part (b) of FIG. 2A illustrates a perspective view of the layout of circuit elements when the principal surface 91b and a principal surface 91c are viewed from the z-axis positive direction.

The RF module 1A according to the present example specifically illustrates the layout of the individual circuit elements constituting the RF module 1 according to the embodiment.

As illustrated in FIG. 2A and FIG. 2B, the RF module 1A according to the present example includes, in addition to the circuit configuration illustrated in FIG. 1, the module substrate 91, resin members 92 and 93, via conductors 95v, and ground via conductors 95v1.

The module substrate 91 is a substrate having the principal surface 91a (first principal surface) and the principal surface 91b (second principal surface) that are on opposite sides of the module substrate 91, and the above-described transmission circuits and reception circuits are mounted thereon. The module substrate 91 also has the principal surface 91c (third principal surface) that is recessed toward the principal surface 91a from the principal surface 91b in a plan view of the principal surface 91b. Because of the disposition relationship between the principal surface 91b and the principal surface 91c, the module substrate 91 includes a recessed region 91R in which the principal surface 91c is a bottom surface, and a protruding region 91S located on the outer periphery of the recessed region 91R, as illustrated in FIG. 2B.

As the module substrate 91, for example, a low temperature co-fired ceramics (LTCC) substrate or high temperature co-fired ceramics (HTCC) substrate having a multilayer structure of a plurality of dielectric layers, a component built-in substrate, a substrate having a redistribution layer (RDL), a printed circuit board, or the like is used.

The resin member 92 is disposed on the principal surface 91a of the module substrate 91, covers part of the above-described transmission circuits, part of the above-described reception circuits, and the principal surface 91a of the module substrate 91, and has a function of ensuring reliability, such as mechanical strength and moisture resistance, of the circuit elements constituting the above-described transmission circuits and reception circuits. The resin member 93 is disposed on the principal surface 91c and in the recessed region 91R of the module substrate 91, covers part of the above-described transmission circuits, part of the above-described reception circuits, and the principal surface 91c of the module substrate 91, and has a function of ensuring reliability, such as mechanical strength and moisture resistance, of the circuit elements constituting the above-described transmission circuits and reception circuits. The resin members 92 and 93 are not essential elements of an RF module according to an embodiment of the present disclosure. Alternatively, an underfill that is in contact with connection electrodes of the circuit components mounted on the principal surface 91c may be disposed on the principal surface 91c, instead of the resin member 93.

As illustrated in FIG. 2A and FIG. 2B, in the RF module 1A according to the present example, the power amplifier 10 and the duplexers 61 and 62 are examples of a first circuit component and are disposed on the principal surface 91a (first principal surface). On the other hand, the low-noise amplifier 20 and the switches 31 to 33 are examples of a second circuit component and are disposed on the principal surface 91c (third principal surface) in the recessed region 91R. The matching circuits 51 to 53 are disposed in the protruding region 91S inside the module substrate 91.

Although not illustrated in FIG. 2A, the wiring lines constituting the transmission paths and reception paths connecting the circuit components illustrated in FIG. 1 are disposed in the module substrate 91 and on the principal surfaces 91a, 91b, and 91c. The wiring lines may be bonding wires whose both ends are joined to the principal surfaces 91a, 91b, and 91c and any one of the circuit elements constituting the RF module 1A, or may be terminals, electrodes, or wiring lines disposed on surfaces of the circuit elements constituting the RF module 1A.

The via conductors 95v are disposed in the protruding region 91S. The via conductors 95v extend in a direction perpendicular to the principal surfaces 91a and 91b, and one ends thereof are exposed on the principal surface 91b.

The RF module 1A transmits electric signals to and receives electric signals from an external substrate disposed in a z-axis negative direction of the RF module 1A via the via conductors 95v. As illustrated in part (b) of FIG. 2A, the via conductors 95v include the antenna connection terminal 100, the transmission input terminal 110, and the reception output terminal 120. Some of the via conductors 95v are the ground via conductors 95v1 that are set to the ground potential of the external substrate.

The via conductors 95v may each terminate, at both ends or one end thereof, with a planar conductor extending in an x-axis direction as illustrated in part (b) of FIG. 2A and FIG. 2B. The planar conductors exposed on the principal surface 91b may have a side surface that is in contact with the module substrate 91 or may protrude in the z-axis negative direction from the module substrate 91. The shapes of the planar conductors exposed on the principal surface 91b correspond to the shapes of connection electrodes disposed on a surface of the external substrate.

With the above-described configuration of the RF module 1A in which the via conductors 95v are disposed in the protruding region 91S of the module substrate 91, it is not necessary to dispose the terminals for electrically connecting the RF module 1A to the external substrate outside the module substrate 91. Accordingly, the via conductors 95v that can establish electrical connection to the external substrate can be formed in the process of forming the module substrate 91, and thus need not be formed in a process different from the process of forming the module substrate 91. As a result, the process of manufacturing the RF module 1A can be simplified. In addition, the first circuit component and the second circuit component constituting the RF module 1A are disposed with the module substrate 91 therebetween, and thus the RF module 1A can be reduced in size. In addition, a region for the terminals used for connection to the external substrate need not be secured outside the module substrate 91, and thus the RF module 1A can be further reduced in size. In addition, the second circuit component including the low-noise amplifier 20 and the switches 31 to 33 can be disposed in the recessed region 91R of the module substrate 91, and thus the RF module 1A can be reduced in height.

The first circuit component disposed on the principal surface 91a may be at least one of the power amplifier 10 and the duplexers 61 and 62. Alternatively, the first circuit component disposed on the principal surface 91a may be at least one of the low-noise amplifier 20, the switches 31 to 33, and the matching circuits 51 to 53.

The second circuit component disposed on the principal surface 91c may be at least one of the low-noise amplifier 20 and the switches 31 to 33. Alternatively, the second circuit component disposed on the principal surface 91c may be at least one of the power amplifier 10, the duplexers 61 and 62, and the matching circuits 51 to 53.

In the RF module 1A according to the present example, the module substrate 91 is exposed on the principal surface 91b side in the protruding region 91S, and the resin member 93 is exposed on the principal surface 91b side in the recessed region 91R.

With this configuration, when the RF module 1A is mounted on the external substrate, the principal surface 91b of the module substrate 91 is joined to the external substrate. This makes it possible to increase the mechanical strength of the RF module 1A compared to an existing RF module that is joined to an external substrate via a resin member or a bump electrode.

In the RF module 1A according to the present example, the power amplifier 10 is disposed on the principal surface 91a. As illustrated in FIG. 2B, one ends of the ground via conductors 95v1 are exposed on the principal surface 91b, and the other ends of the ground via conductors 95v1 are joined to, on the principal surface 91a, the ground electrodes of the power amplifier 10.

The power amplifier 10 is a component that generates a large amount of heat among the circuit components included in the RF module 1A. To enhance the heat dissipation performance of the RF module 1A, it is important to dissipate heat generated by the power amplifier 10 to the external substrate via a heat dissipation path having a small thermal resistance. If the power amplifier 10 is mounted on the principal surface 91b or 91c, an electrode wiring line connected to the power amplifier 10 is disposed on the principal surface 91b or 91c. In this case, the heat dissipation path includes a heat dissipation path that passes through only a plane wiring pattern on the principal surface 91b or 91c (in the xy plane direction). The plane wiring pattern is formed of a metal thin film and thus has a large thermal resistance. Thus, if the power amplifier 10 is disposed on the principal surface 91b or 91c, the heat dissipation performance decreases.

In contrast, in a case where the power amplifier 10 is disposed on the principal surface 91a, the power amplifier 10 can be connected to the external substrate via the ground via conductors 95v1 extending between the principal surfaces 91a and 91b. Thus, it is possible to exclude, as the heat dissipation path for the power amplifier 10, a heat dissipation path that passes through only a plane wiring pattern in the xy plane direction having a large thermal resistance. Thus, it is possible to provide the RF module 1A that is compact and that has enhanced performance of heat dissipation from the power amplifier 10 to the external substrate.

It is desired that a plurality of ground via conductors 95v1 be joined to one ground electrode of the power amplifier 10. This enables the thermal resistance of the heat dissipation path of the power amplifier 10 to be reduced, and thus the heat dissipation performance is further enhanced. The plurality of ground via conductors 95v1 may be connected to each other by a planer conductor extending in parallel with the principal surfaces 91a and 91b, as illustrated in FIG. 2B.

In the present example, the ground via conductors 95v1 extend through the module substrate 91 in a direction perpendicular to the principal surfaces 91a and 91b. Alternatively, the ground via conductors 95v1 may have the following shape. That is, the ground via conductors 95v1 may have a configuration in which a plurality of pillar-shaped conductors extending in the direction perpendicular to the principal surfaces 91a and 91b are cascade-connected in the perpendicular direction, and may have an overlapping region over the plurality of pillar-shaped conductors in a plan view of the module substrate 91. The ground via conductors 95v1 having this region are also included in the ground via conductors 95v1 extending in the perpendicular direction.

In the RF module 1A according to the present example, the low-noise amplifier 20 is disposed on the principal surface 91c.

With this disposition, the power amplifier 10 that amplifies a transmission signal and the low-noise amplifier 20 that amplifies a reception signal are separately disposed on different surfaces of the module substrate 91, and thus isolation between transmission and reception is enhanced.

It is desired that the module substrate 91 have a multilayer structure including a plurality of laminated dielectric layers and that at least one of the plurality of dielectric layers have a ground electrode pattern. This configuration improves the electromagnetic field blockage function of the module substrate 91.

In the RF module 1A according to the present example, the switch 33 is disposed in the recessed region 91R. With this disposition of being disposed in the recessed region 91R, the height of the RF module 1A can be reduced because the switch 33 is a low-profile component like the low-noise amplifier 20.

The low-noise amplifier 20 and the switch 33 are included in a single semiconductor IC 40, and thus the RF module 1A can be reduced in size.

In the RF module 1A according to the present example, the duplexers 61 and 62 are disposed on the principal surface 91a, and the switches 31 and 32 are disposed on the principal surface 91c. In other words, the switches 31 and 32 which are low-profile components like the low-noise amplifier 20 are disposed in the recessed region 91R, and the duplexers 61 and 62 which are difficult to be reduced in height like the power amplifier 10 are disposed on the principal surface 91a. With this disposition, the first circuit components disposed on the principal surface 91a have similar heights, and the second circuit components disposed on the principal surface 91c have similar heights, and thus the entire RF module 1A can be reduced in height.

In the recessed region 91R, a shield wall 94G for separating the plurality of second circuit components may be disposed. The shield wall 94G may be disposed, for example, inside the resin member 93 so as to isolate the low-noise amplifier 20 and the switch 31 from each other. With this configuration, the electromagnetic coupling between the two second circuit components disposed in the recessed region 91R with the shield wall 94G therebetween can be suppressed. For example, the electromagnetic coupling between the switch 31 and the low-noise amplifier 20 can be suppressed. This makes it possible to suppress the occurrence of a situation in which a harmonic of a high-power transmission signal transmitted through a transmission path or intermodulation distortion between the transmission signal and another RF signal flows into the low-noise amplifier 20 through the electromagnetic coupling, causing degradation of the reception sensitivity of a reception path.

In the RF module 1A according to the present example, the matching circuits 51, 52, and 53 each include at least one of an inductor and a capacitor disposed in the protruding region 91S inside the module substrate 91.

With this configuration, the matching circuits 51, 52, and 53 are not disposed on the principal surfaces of the module substrate 91 but are disposed in the protruding region 91S inside the module substrate 91. This eliminates the necessity for securing a space for surface-mounting the matching circuits 51, 52, and 53 outside the module substrate 91, and thus a reduction in the size of the RF module 1A can be promoted.

Figure 2C:
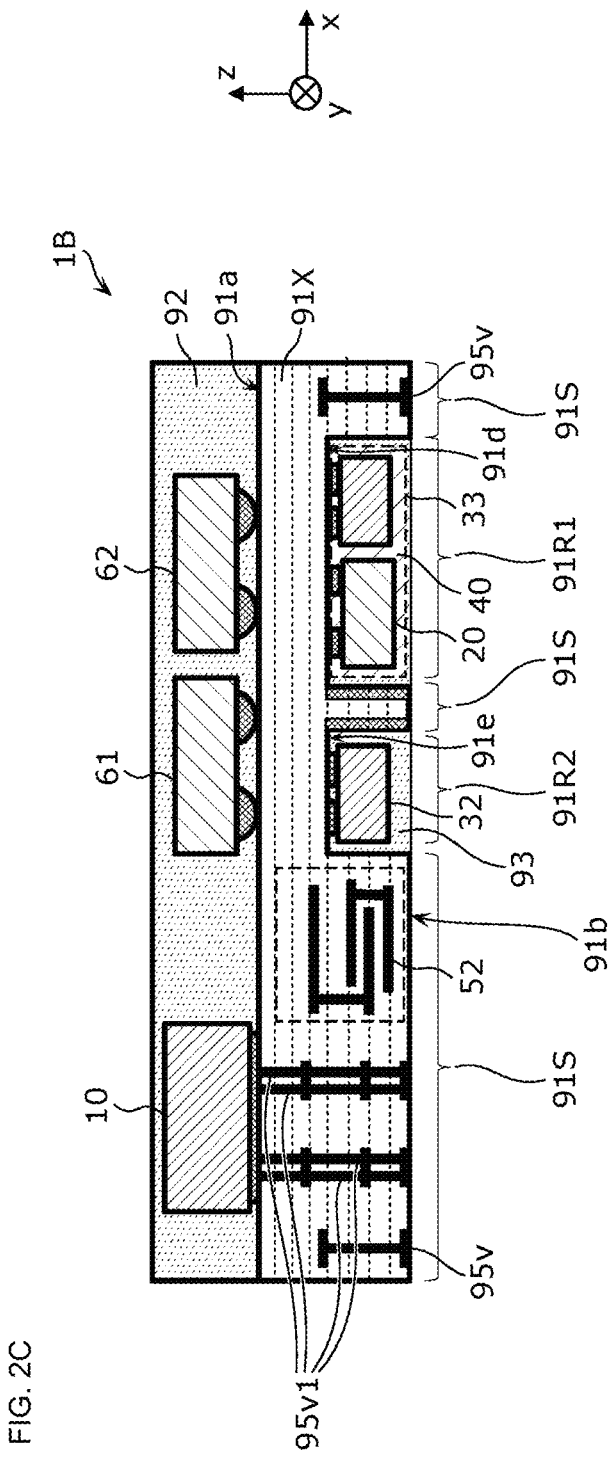
FIG. 2C is a schematic sectional view of the configuration of a radio-frequency module according to a modification example.

3. Layout of Circuit Elements of RF Module 1B According to Modification Example FIG. 2C is a schematic sectional view of the configuration of an RF module 1B according to the modification example.

The RF module 1B according to the modification example specifically illustrates the layout of the individual circuit elements constituting the RF module 1 according to the embodiment.

The RF module 1B according to the present modification example is different from the RF module 1A according to the example in the structure of a module substrate 91X. Hereinafter, the RF module 1B according to the present modification example will be described mainly of differences from the RF module 1A according to the example, and the description of the same points as those of the RF module 1A will be omitted.

The module substrate 91X is a substrate having a principal surface 91a (first principal surface) and a principal surface 91b (second principal surface) that that are on opposite sides of the module substrate 91X, and the above-described transmission circuits and reception circuits are mounted thereon. The module substrate 91X also has principal surfaces 91d and 91e that are recessed toward the principal surface 91a from the principal surface 91b in a plan view of the principal surface 91b. Because of the disposition relationship among the principal surface 91b, the principal surface 91d, and the principal surface 91e, the module substrate 91X includes a recessed region 91R1 (first recessed region) in which the principal surface 91d is a bottom surface, a recessed region 91R2 (second recessed region) in which the principal surface 91e is a bottom surface, and a protruding region 91S surrounding the recessed regions 91R1 and 91R2 as illustrated in FIG. 2C.

The resin member 92 is disposed on the principal surface 91a of the module substrate 91X, covers part of the above-described transmission circuits, part of the above-described reception circuits, and the principal surface 91a of the module substrate 91X, and has a function of ensuring reliability, such as mechanical strength and moisture resistance, of the circuit elements constituting the above-described transmission circuits and reception circuits. The resin member 93 is disposed on the principal surfaces 91d and 91e and in the recessed regions 91R1 and 91R2 of the module substrate 91X, covers part of the above-described transmission circuits, part of the above-described reception circuits, and the principal surfaces 91d and 91e of the module substrate 91X, and has a function of ensuring reliability, such as mechanical strength and moisture resistance, of the circuit elements constituting the above-described transmission circuits and reception circuits. The resin members 92 and 93 are not essential elements of an RF module according to an embodiment of the present disclosure.

As illustrated in FIG. 2C, in the RF module 1B according to the present modification example, the power amplifier 10 and the duplexers 61 and 62 are examples of the first circuit component and are disposed on the principal surface 91a (first principal surface). On the other hand, the low-noise amplifier 20 and the switches 31 to 33 are examples of the second circuit component, the switch 31 (not illustrated in FIG. 2C) and the switch 32 are disposed on the principal surface 91e in the recessed region 91R2, and the low-noise amplifier 20 and the switch 33 are disposed on the principal surface 91d in the recessed region 91R1. The matching circuits 51 to 53 are disposed in the protruding region 91S inside the module substrate 91X.

A shield electrode layer is disposed in a portion of the protruding region 91S between the recessed region 91R1 and the recessed region 91R2.

With this configuration, it is possible to suppress the electromagnetic coupling between the second circuit component disposed in the recessed region 91R1 and the second circuit component disposed in the recessed region 91R2. For example, it is possible to suppress the electromagnetic coupling between the switch 31 and the low-noise amplifier 20, and thus it is possible to suppress the occurrence of a situation in which a harmonic of a high-power transmission signal transmitted through a transmission path or intermodulation distortion between the transmission signal and another RF signal flows into the low-noise amplifier 20 through the electromagnetic coupling, causing degradation of the reception sensitivity of a reception path.

In the protruding region 91S disposed between the recessed region 91R1 and the recessed region 91R2, a ground via conductor extending in a direction perpendicular to the principal surface 91b may be disposed instead of the shield electrode layer. With this configuration, it is possible to suppress the electromagnetic coupling between the second circuit component disposed in the recessed region 91R1 and the second circuit component disposed in the recessed region 91R2.

4. Advantages and the Like

As described above, the RF module 1 according to the present embodiment includes the module substrate 91 having the principal surface 91a and the principal surface 91b that are on opposite sides of the module substrate 91, a first circuit component, and a second circuit component. The module substrate 91 further has the principal surface 91c that is recessed toward the principal surface 91a from the principal surface 91b in a plan view of the principal surface 91b. The module substrate 91 includes the recessed region 91R in which the principal surface 91c is a bottom surface, and the protruding region 91S located on an outer periphery of the recessed region 91R, in a plan view of the principal surface 91b. The protruding region 91S has the via conductors 95v disposed therein, the via conductors 95v each extending in a direction perpendicular to the principal surface 91b and having one end exposed on the principal surface 91b. The first circuit component is disposed on the principal surface 91a, and the second circuit component is disposed on the principal surface 91c in the recessed region 91R.

With this configuration in which the via conductors 95v are disposed in the protruding region 91S, it is not necessary to dispose the terminals for electrically connecting the RF module 1 to an external substrate outside the module substrate 91. Accordingly, the via conductors 95v that can establish electrical connection to the external substrate can be formed in the process of forming the module substrate 91, and thus need not be formed in a process different from the process of forming the module substrate 91. As a result, the process of manufacturing the RF module 1 can be simplified. In addition, the first circuit component and the second circuit component constituting the RF module 1 are disposed with the module substrate 91 therebetween, and thus the RF module 1 can be reduced in size. In addition, a region for the terminals used for connection to the external substrate need not be secured outside the module substrate 91, and thus the RF module 1 can be further reduced in size. In addition, the second circuit component can be disposed in the recessed region 91R of the module substrate 91, and thus the RF module 1 can be reduced in height.

The RF module 1 may further include the resin member 93 disposed in the recessed region 91R. In the protruding region 91S, the module substrate 91 may be exposed on the principal surface 91b side among the principal surfaces 91a and 91b. In the recessed region 91R, the resin member 93 may be exposed on the principal surface 91b side among the principal surfaces 91a and 91b.

With this configuration, when the RF module 1 is mounted on the external substrate, the principal surface 91b of the module substrate 91 is joined to the external substrate. This makes it possible to increase the mechanical strength of the RF module 1 compared to an existing RF module that is joined to an external substrate via a resin member.

In the RF module 1, the first circuit component may be the power amplifier 10, and the ground via conductors 95v1 each may have one end exposed on the principal surface 91b and the other end joined to, on the principal surface 91a, a ground electrode of the power amplifier 10.

With this configuration in which the power amplifier 10 is disposed on the principal surface 91a, the power amplifier 10 can be connected to the external substrate via the ground via conductors 95v1 extending between the principal surfaces 91a and 91b. Thus, it is possible to exclude, as the heat dissipation path for the power amplifier 10, a heat dissipation path that passes through only a plane wiring pattern in the xy plane direction having a large thermal resistance. Thus, it is possible to provide the RF module 1 that is compact and that has enhanced performance of heat dissipation from the power amplifier 10 to the external substrate.

In the RF module 1, the second circuit component may be the low-noise amplifier 20.

With this disposition, the power amplifier 10 that amplifies a transmission signal and the low-noise amplifier 20 that amplifies a reception signal are separately disposed on different surfaces of the module substrate 91, and thus isolation between transmission and reception is enhanced.

The RF module 1 may further include the antenna connection terminal 100, and the switch 33 connected to the antenna connection terminal 100 and configured to switch between connection and non-connection between the antenna connection terminal 100 and the low-noise amplifier 20.

In the RF module 1, the switch 33 may be disposed in the recessed region 91R.

With this disposition of being disposed in the recessed region 91R, the height of the RF module 1 can be reduced because the switch 33 is a low-profile component like the low-noise amplifier 20.

In the RF module 1, the low-noise amplifier 20 and the switch 33 may be included in the single semiconductor IC 40.

With this configuration, the RF module 1 can be reduced in size.

The RF module 1 may further include the transmission filter 61T, the reception filter 61R, the switch 31 configured to switch between connection and non-connection between the transmission filter 61T and the power amplifier 10, and the switch 32 configured to switch between connection and non-connection between the reception filter 61R and the low-noise amplifier 20. The transmission filter 61T and the reception filter 61R may be disposed on the principal surface 91a, and the switch 31 and the switch 32 may be disposed on the principal surface 91c.

With this configuration, the switches 31 and 32 which are low-profile components like the low-noise amplifier 20 are disposed in the recessed region 91R, and the duplexer 61 which is difficult to be reduced in height like the power amplifier 10 is disposed on the principal surface 91a. With this disposition, the first circuit components disposed on the principal surface 91a have similar heights, and the second circuit components disposed on the principal surface 91c have similar heights, and thus the entire RF module 1 can be reduced in height.

In the RF module 1B, the recessed region may include the recessed region 91R1 and the recessed region 91R2 separated from each other by a portion of the protruding region 91S in a plan view of the principal surface 91b, the portion of the protruding region 91S disposed between the recessed region 91R1 and the recessed region 91R2 may have a shield electrode layer or a ground via conductor disposed therein, the low-noise amplifier 20 may be disposed in the recessed region 91R1, and the switch 31 may be disposed in the recessed region 91R2.

With this configuration, the electromagnetic coupling between the switch 31 and the low-noise amplifier 20 can be suppressed. This makes it possible to suppress the occurrence of a situation in which a harmonic of a high-power transmission signal transmitted through a transmission path or intermodulation distortion between the transmission signal and another RF signal flows into the low-noise amplifier 20 through the electromagnetic coupling, causing degradation of the reception sensitivity of a reception path.

The RF module 1 may further include the matching circuit 51 connected to the output terminal of the power amplifier 10. The matching circuit 51 may include at least one of an inductor and a capacitor disposed in the protruding region 91S inside the module substrate 91.

The RF module 1 may further include the matching circuit 52 connected to the input terminal of the low-noise amplifier 20. The matching circuit 52 may include at least one of an inductor and a capacitor disposed in the protruding region 91S inside the module substrate 91.

The RF module 1 may further include the matching circuit 53 connected to the switch 33. The matching circuit 53 may include at least one of an inductor and a capacitor disposed in the protruding region 91S inside the module substrate 91.

With this configuration, the matching circuits 51, 52, and 53 are not disposed on the principal surfaces of the module substrate 91 but are disposed in the protruding region 91S inside the module substrate 91. This eliminates the necessity for securing a space for surface-mounting the matching circuits 51, 52, and 53 outside the module substrate 91, and thus a reduction in the size of the RF module 1 can be promoted.

The communication device 5 includes the antenna 2, the RFIC 3 configured to process an RF signal that is to be transmitted by the antenna 2 or that has been received by the antenna 2, and the RF module 1 configured to transmit the RF signal between the antenna 2 and the RFIC 3.

With this configuration, it is possible to provide the communication device 5 that has a simplified manufacturing process and that has a reduced size.

OTHER EMBODIMENTS

The RF module and the communication device according to the embodiment of the present disclosure have been described above by using an embodiment, an example, and a modification example. An RF module and a communication device according to an embodiment of the present disclosure are not limited to the above-described embodiment, example, and modification example. Another embodiment implemented by combining certain elements in the above-described embodiment, example, and modification example; a modification example obtained by applying, to the above-described embodiment, example, and modification example, various modifications conceived of by a person skilled in the art without deviating from the gist of the present disclosure; and various apparatuses including the above-described RF module and communication device, are also included in the present disclosure.

For example, in the RF module and the communication device according to the above-described embodiment, example, and modification example, another circuit element, wiring line, and so forth may be disposed on a path that connects each circuit element and a signal path disclosed in the drawings.

An embodiment of the present disclosure can be widely used, in communication devices such as mobile phones, as an RF module disposed in a multiband-compatible front-end portion.

While preferred embodiments of the disclosure have been described above, it is to be understood that variations and modifications will be apparent to those skilled in the art without departing from the scope and spirit of the disclosure. The scope of the invention, therefore, is to be determined solely by the following claims.

What is claimed is:

1. A radio-frequency module comprising:
   a module substrate including
     a first principal surface;
     a second principal surface on a side of the module substrate that is opposite to the first principal surface;
     a third principal surface that is recessed toward the first principal surface from the second principal surface in a plan view of the second principal surface;
     a recessed region in which the third principal surface is a bottom surface; and
     a protruding region located on an outer periphery of the recessed region, in a plan view of the second principal surface, wherein the protruding region has a via conductor disposed therein, the via conductor extending in a direction perpendicular to the second principal surface and having a first end exposed on the second principal surface;
   a first circuit component disposed on the first principal surface; and
   a second circuit component disposed on the third principal surface in the recessed region.

2. The radio-frequency module of claim 1, further comprising:
   a resin member disposed in the recessed region.

3. The radio frequency module of claim 2, wherein
   in the protruding region, the module substrate is exposed on a side of the second principal surface, and
   in the recessed region, the resin member is exposed on a side of the second principal surface.

4. The radio-frequency module of claim 1, wherein
   the first circuit component comprises a power amplifier.

5. The radio-frequency module of claim 4, further comprising:
   a matching circuit connected to an output terminal of the power amplifier, wherein
   the matching circuit includes at least one of an inductor and a capacitor disposed in the protruding region inside the module substrate.

6. The radio-frequency module of claim 4, wherein
   a second end of the via conductor is joined to, on the first principal surface, a ground electrode of the power amplifier.

7. The radio-frequency module of claim 6, wherein the second circuit component comprises a low-noise amplifier.

8. The radio-frequency module of claim 7, further comprising:
   an antenna connection terminal; and
   a first switch connected to the antenna connection terminal and configured to switch between connection and non-connection between the antenna connection terminal and the low-noise amplifier.

9. The radio-frequency module of claim 8, wherein the first switch is disposed in the recessed region.

10. The radio-frequency module of claim 9, wherein the low-noise amplifier and the first switch are included in a single semiconductor integrated circuit.

11. The radio-frequency module of claim 8, further comprising
    a matching circuit connected to the first switch, wherein
    the matching circuit includes at least one of an inductor and a capacitor disposed in the protruding region inside the module substrate.

12. The radio-frequency module of claim 7, further comprising:
    a transmission filter;
    a reception filter;
    a second switch configured to switch between connection and non-connection between the transmission filter and the power amplifier; and
    a third switch configured to switch between connection and non-connection between the reception filter and the low-noise amplifier.

13. The radio-frequency module of claim 12, wherein
    the transmission filter and the reception filter are disposed on the first principal surface, and
    the second switch and the third switch are disposed on the third principal surface.

14. The radio-frequency module of claim 13, wherein
    the recessed region includes a first recessed region and a second recessed region separated from each other by a portion of the protruding region in a plan view of the second principal surface, and
    the portion of the protruding region disposed between the first recessed region and the second recessed region has a shield electrode layer or a ground via conductor disposed therein.

15. The radio frequency module of claim 14, wherein
    the low-noise amplifier is disposed in the first recessed region, and
    the second switch is disposed in the second recessed region.

16. The radio-frequency module of claim 7, further comprising
    a matching circuit connected to an input terminal of the low-noise amplifier, wherein
    the matching circuit includes at least one of an inductor and a capacitor disposed in the protruding region inside the module substrate.

17. A communication device comprising:
    an antenna;

a radio-frequency signal processing circuit configured to process a radio-frequency signal that is to be transmitted by the antenna or that has been received by the antenna; and
a radio-frequency module configured to transmit the radio-frequency signal between the antenna and the radio-frequency signal processing circuit, wherein
the radio frequency module including
a module substrate including
a first principal surface;
a second principal surface on a side of the module substrate that is opposite to the first principal surface;
a third principal surface that is recessed toward the first principal surface from the second principal surface in a plan view of the second principal surface:
a recessed region in which the third principal surface is a bottom surface; and
a protruding region located on an outer periphery of the recessed region, in a plan view of the second principal surface, wherein the protruding region has a via conductor disposed therein, the via conductor extending in a direction perpendicular to the second principal surface and having a first end exposed on the second principal surface;
a first circuit component disposed on the first principal surface; and
a second circuit component disposed on the third principal surface in the recessed region.

18. A module substrate comprising:
a first principal surface:
a second principal surface on a side of the module substrate that is opposite to the first principal surface;
a third principal surface that is recessed toward the first principal surface from the second principal surface in a plan view of the second principal surface;
a recessed region in which the third principal surface is a bottom surface; and
a protruding region having a first portion located on an outer periphery of the recessed region, in a plan view of the second principal surface, wherein
the first portion of the protruding region has a via conductor disposed therein, the via conductor extending in a direction perpendicular to the second principal surface and having an end exposed on the second principal surface,
the recessed region includes a first recessed region and a second recessed region separated from each other by a second portion of the protruding region in a plan view of the second principal surface, and
the second portion of the protruding region disposed between the first recessed region and the second recessed region has a shield electrode layer or a ground via conductor disposed therein.

* * * * *